May 23, 1939.　　　　R. ALKAN　　　　2,159,118
GYROSCOPE
Filed May 1, 1935　　　2 Sheets-Sheet 2
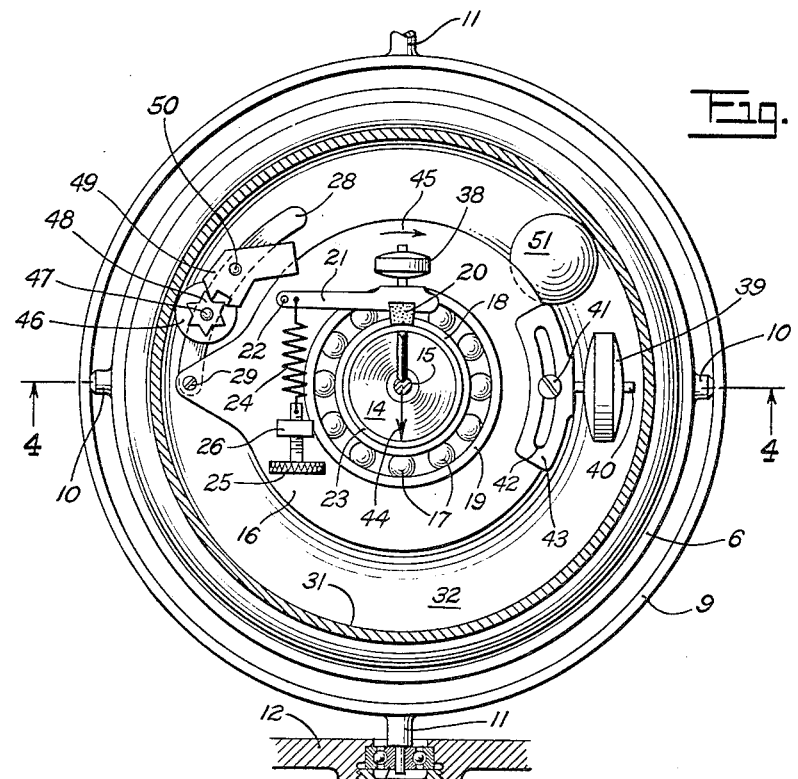
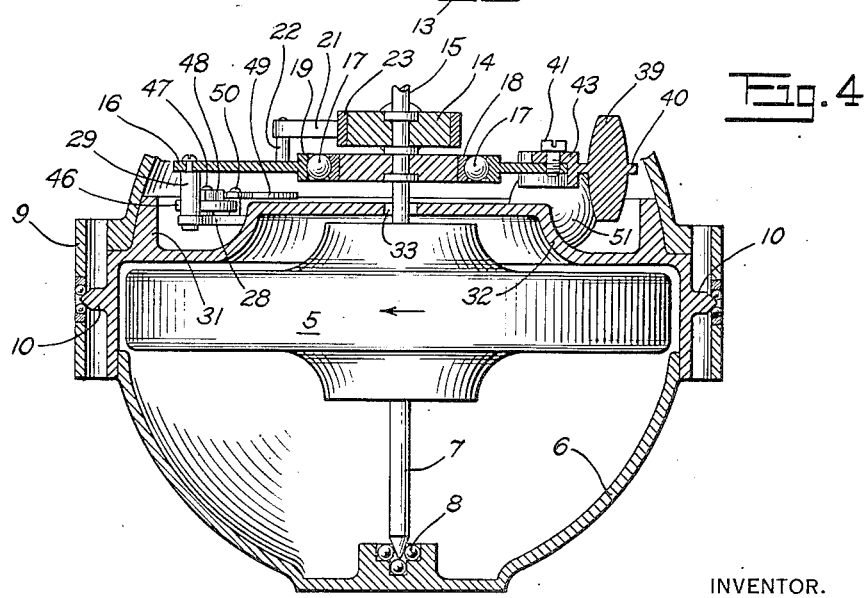
INVENTOR.
Robert Alkan
BY Stephen Cerstvik
ATTORNEY.

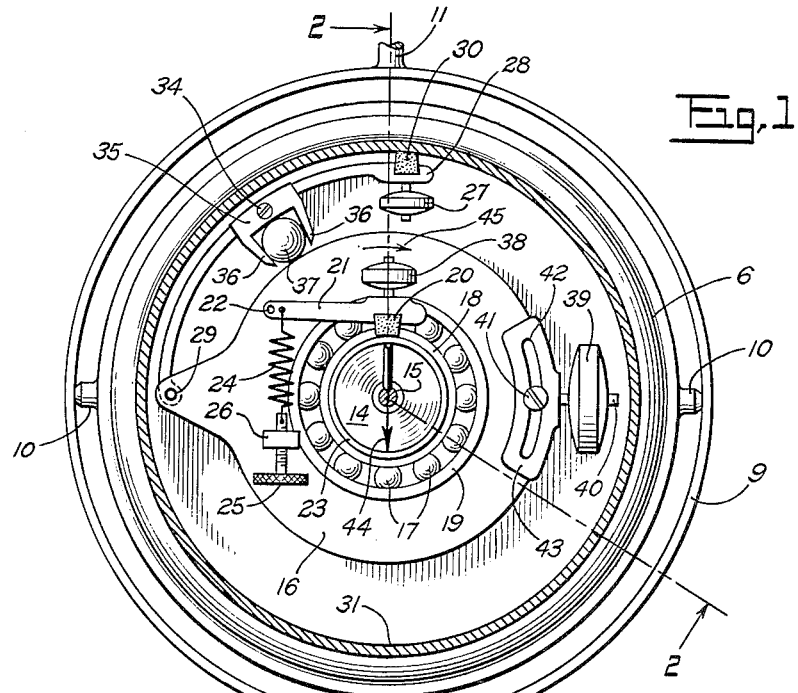

Patented May 23, 1939

2,159,118

UNITED STATES PATENT OFFICE 2,159,118

GYROSCOPE

Robert Alkan, Paris, France

Application May 1, 1935, Serial No. 19,241
In France May 9, 1934

15 Claims. (Cl. 74—5)

The present invention relates to gyroscopic devices of the type adapted for indicating the true vertical so as to provide an artificial horizon on a mobile vehicle such, for example, as an aircraft, when the actual horizon is not visible, as in a fog, and more particularly to self-erecting means for such devices for maintaining the gyro axis vertical.

One of the objects of the invention is to provide a novel gyro-vertical or artificial horizon having increased sensitivity and precision, particularly in the neighborhood of its position of stable equilibrium.

Another object of the invention is to provide a novel gyro-vertical or artificial horizon in which disturbances thereof due to accelerations produced by turning of the craft or due to other accelerations are substantially reduced.

Another object is to provide a gyro-vertical or artificial horizon having novel means for rapidly damping the oscillations or precession of the gyroscope about its position of equilibrium.

Another object is to provide a novel gyro-vertical or artificial horizon for use in an aircraft and so constructed and arranged that it will not be rendered inoperative during violent manoeuvers of the craft.

Still another object of the invention is to provide a novel gyro-vertical or artificial horizon comprising a vertically-spinning gyroscope mounted for three degrees of freedom, an auxiliary mass or weight mounted on said gyroscope to travel in a circular path co-axial with the vertical spin axis of the gyroscope, and novel means for controlling said mass, whereby, when said gyroscope departs from the vertical position, erecting forces are set up which return the gyroscope to said vertical position.

A further object is to provide a novel gyro-vertical or artificial horizon comprising a gyroscope having a vertically spinning rotor mounted for three degrees of freedom, an auxiliary mass or weight mounted on said gyroscope to travel in a circular path co-axial with the spin axis of said rotor, and means for rotating said mass at variable speed about said spin axis, whereby, when said gyroscope inclines from the vertical position, erecting forces are set up which return said gyroscope to said vertical position.

Still another object of the invention is to provide a novel gyro-vertical or artificial horizon comprising a gyroscope having a vertically spinning rotor mounted in gimbals for three degrees of freedom, an auxiliary mass or weight mounted on said gyroscope to travel in a circular path co-axial with the spin axis of said rotor, and means driven by the shaft of the rotor for rotating said mass or weight at variable speed about said spin axis, whereby, upon inclination of said gyroscope with respect to the vertical, erecting forces are set up which return said gyroscope to said vertical.

A still further object is to provide a novel gyro-vertical or artificial horizon of the class described, in which the auxiliary mass is rotated in such a manner that its speed of rotation is modified during each revolution according to the magnitude and direction of the disturbing acceleration forces acting on the entire system relative to the gyroscope.

Another object is to provide a novel gyro-vertical or artificial horizon of the above-described type, provided with means for driving said rotatable mass at variable speed, and means for retarding the rotation of said mass, the action of said two means being modified by the component of instantaneous accelerations perpendicular to the spin axis of the gyro rotor, whereby the speed of rotation of said auxiliary mass is regulated in such a manner as to produce erecting forces proportional to the magnitude and in accordance with the direction of the disturbing accelerations for returning the gyroscope to the vertical upon disturbance thereof by said accelerations.

A further object of the invention is to provide a novel gyro-vertical or artificial horizon of the type herein described, in which the sensitivity and precision thereof is increased by imposing on the gyroscope a slight continuous oscillation or nutation about its vertical axis.

A still further object is to provide in a gyro-vertical or artificial horizon, a novel combination comprising a universally mounted gyroscope having three degrees of freedom and its rotor spinning about a normally vertical axis, a frame rotatable about the spin axis, means cooperating with the shaft of the rotor for driving said frame at a speed substantially less than the speed of the rotor, a weight rotated by said frame about the spin axis of the rotor, and means controlled by the weight for producing a retarding action on said rotating frame to vary the speed thereof upon departure of the spin axis of said rotor from the vertical, whereby erecting forces are produced to return said spin axis back to vertical.

Another object of the invention is to provide in a gyro-vertical or artificial horizon including a gyroscope having a normally vertical spin axis and mounted in gimbals for angular movement about two mutually perpendicular horizontal axes at right angles to said spin axis, novel means for maintaining said spin axis vertical comprising a frame rotatable about the spin axis of said gyroscope, slip driving means driven by said gyroscope co-axially therewith for rotating said frame about said spin axis at a speed substantially less than the speed of said rotor, a weight rotated by said frame about the spin axis of said rotor, and retarding means connected to said frame and cooperating with a fixed part of the gyroscope for retarding the rotation of said frame to vary the speed thereof and of the weight, said retarding means including an escapement wheel and a non-isochronous anchor cooperating therewith to regulate said retarding means and to produce a resisting couple to the rotation of said frame proportional to the speed of rotation of said weight, said retarding means being rendered effective by said weight upon deviation of the spin axis of the gyro rotor from vertical, to produce erecting forces for returning said spin axis back to vertical.

A still further object of the invention is to provide in a gyro-vertical or artificial horizon comprising a gyroscope having a rotor mounted for spinning about a normally vertical axis and for angular movement about two mutually perpendicular horizontal axes at right angles to the spin axis, novel means for maintaining said spin axis vertical and comprising a mass adapted to be rotated at variable speed about the spin axis of the gyroscope, means driven by said gyroscope for rotating said mass about said spin axis, said driving means being adapted to slip by the action of said mass upon departure of the spin axis from vertical, and means effective upon departure of said spin axis from vertical for retarding the rotation of said mass, whereby erecting forces are produced on the gyroscope to return its spin axis to vertical.

The foregoing and other objects and advantages of the invention will appear more fully hereinafter from a consideration of the detailed description which follows, taken together with the accompanying two sheets of drawings wherein two embodiments of the invention are illustrated by way of example. It is to be expressly understood, however, that the drawings are intended for purposes of illustration and description only and are not to be construed as defining the limits of the invention, reference being had for this purpose to the appended claims.

In the drawings, wherein like reference characters refer to like parts throughout the several views, Fig. 1 is a top plan view of a gyro-vertical embodying the present invention, with the top portion of the gyro casing removed, showing one embodiment of the erecting means of the invention;

Fig. 2 is a vertical section taken on line 2—2 of Fig. 1;

Fig. 3 is a top plan view similar to Fig. 1, showing another embodiment of the erecting means of the invention; and Fig. 4 is a vertical section taken on line 4—4 of Fig. 3.

The invention consists substantially in the construction, combination, location and relative arrangement of parts for obtaining the results desired in accordance with the foregoing objects, as will be more fully hereinafter set forth in the specification, as shown in the drawings by way of example, and as finally pointed out in the claims.

The gyro-vertical embodying the invention comprises a gyroscope having a rotor mounted in a Cardan suspension for spinning about a normally vertical axis and for angular movement about two mutually perpendicular horizontal axes at right angles to the spin axes, the rotor per se being enclosed and journaled, in the present instance, in a casing carried in gimbals forming the Cardan suspension. The rotor may be driven electrically or in any other suitable manner known in the art.

The novel means for stabilizing the gyroscope, i. e. for maintaining its rotor axis vertical in order that the gyroscope may serve as a gyro-vertical or artificial horizon, comprises, broadly, a mass or weight of suitable form arranged on the gyroscope in such a manner as to be rotatable about the spin axis of the gyro rotor. For this purpose there are provided means in the form of a frame or carriage mounted co-axially with the spin axis of the rotor cooperating with the weight to rotate the same about said spin axis.

The weight may be carried by the frame and in addition to or in lieu of the first weight, another weight may be used in the form of a rolling ball confined to travel in a circular path about the spin axis of the rotor and rotated by the frame or carriage. Driving means having a slip driving connection to the gyro rotor are provided for driving the frame or carriage to rotate the mass carried thereby, and/or the rolling ball which is carried by a circular track secured to or formed integrally with the gyro casing, and then further means are provided for retarding the rotation of the frame and weight or weights to produce the slipping action in the drive between the frame and gyro rotor, thereby causing rotation of the frame or carriage, the mass and/or the ball at a speed substantially less than the speed of rotation of the gyro rotor.

The retarding means may be in the form of a brake or an escapement device carried by the frame or carriage and cooperating with a wall of the stationary gyro casing.

As long as the rotor axis remains substantially vertical, i. e. in its normally vertical position, the frame rotates at a substantially constant speed which, however, is materially less than the speed of the rotor. For example, the frame may rotate in this manner at a speed of only a few dozens of revolutions per minute, while the rotor per se may have a speed of several thousand revolutions per minute.

When, however, the spin axis of the rotor departs from its normally vertical position, due to friction, accelerations or other disturbing forces, the weight or weights rotated by the frame or carriage cooperate with the retarding means to cause the latter to produce a variable retarding action on the frame, and, hence, on the weight or weights, whereby erecting forces are produced which return the spin axis of the gyro rotor back to vertical at which time the frame and weight or weights are brought back to constant speed.

Two specific embodiments of the aforesaid broad combination will now be described with reference to the drawings.

Referring now to Figs. 1 and 2, one embodiment of the invention comprises, as shown, a gyroscope including a rotor 5 mounted in a stationary casing 6 for spinning about a normally vertical axis, said rotor 5 having a shaft 7 secured thereto or formed integrally therewith, one end of said shaft 7 being journaled in a bearing 8 at the mottom of the casing 6, while the upper end of said shaft is journaled in a similar bearing (not shown) in the upper part of the casing 6.

The casing 6 is mounted in a Cardan suspension comprising a gimbal ring 9 in which the casing 6 per se is pivoted for angular movement about a horizontal axis formed by the pivots 10, 10, the ring 9, in turn being pivoted for angular movement about another horizontal axis formed by pivots 11, 11. The latter pivots are journaled in a fixed support 12 as shown at 13.

The gyro rotor 5 may be driven in any suitable manner known to those skilled in the art to which the invention appertains and, therefore, the specific driving means for said rotor are not shown since such means are not a part of the present invention. An electrical drive, for example, might be employed. Suffice it to say that the rotor 5 is driven to rotate at several thousand revolutions per minute.

The novel means of the invention are now provided for maintaining the spin axis of the rotor 5 vertical at all times, whereby the gyroscope may serve as an indicator of the true vertical or as an artificial horizon. For this purpose, there is provided a driving drum 14 secured to or formed integrally with the upper end 15 of the rotor shaft 7 so that said drum will rotate co-axially therewith at the speed of said rotor.

Mounted co-axially with the driving drum 14 and rotor 5 for rotation about the spin axis of said rotor is a frame or carriage shown in the present embodiment as a plate 16 which is journaled on the upper end 15 of the shaft 7 beneath the drum 14 by ball bearings 17 seated in an inner ball race 18 rigidly secured to the upper end 15 of the shaft 7 and an outer ball race 19 formed integrally with the frame 16.

A slip drive is now provided for rotating the frame 16 about the shaft 7 at a substantially lesser speed than that of the shaft 7 and its rotor 5. A friction drive is shown by way of example, comprising a friction member or shoe 20 carried by an arm 21 pivoted about a vertical axis 22 on frame 16. The friction member or shoe 20 cooperates with a friction band or collar 23 secured to the periphery of the driving drum 14, and the shoe is urged into frictional driving engagement with the collar 23 by the pivoted arm 21 with the aid of a tension spring 24 having one end thereof connected to the arm 21 adjacent the pivot 22 and the other end connected to an adjustable screw member 25 threaded in a post 26 carried by the frame or carriage 16. By means of the screw member 25, the tension of spring 24 and, hence, the pressure of the shoe 20 on collar 23 may be adjusted as desired.

From the foregoing it will be seen that by virtue of the connection of the pivoted arm 21 to frame 16, and the frictional engagement of the shoe 20 with the friction collar 23 on the driving drum 14, the latter will drive said frame 16, thereby causing rotation of said frame about the shaft 7 by virtue of the ball bearing connection 17, 18, 19 and, hence, about the spin axis of the rotor 5.

It is desirable that the speed of rotation of the frame 16 be substantially less than that of the rotor and be substantially independent of any variations in the speed of said rotor. For this purpose, retarding and regulating means are provided to act on said frame and, in the form illustrated in Figs. 1 and 2, said means comprise a centrifugally actuated weight 27 carried at the end of a curved arm 28 which is carried by the frame or plate 16 and is pivoted at its other end at 29 on said frame.

Also attached to arm 28 at the end where the weight 27 is secured is a friction member or brake shoe 30 which frictionally engages and cooperates with the inner wall 31 of a stationary drum 32 secured to and forming part of the complete casing 6 and disposed coaxially with and above the rotor 5 as shown in Fig. 2, there being a central opening 33 in said drum 32 to permit passage of the upper end 15 of the shaft 7 therethrough. If desired, a bearing (not shown) may be disposed in said opening 33 for additional journaling of the rotor shaft 7 at this point.

Intermediate the ends of the curved arm 28 and adjustably attached thereto by means of a set screw 34 is a bracket 35 provided with fingers 36 between which is loosely held a rolling mass or ball 37 which is adapted to be rotated and rolled by said bracket 35 and arm 28 along the bottom wall of the drum 32 when said arm and bracket are rotated by and with the frame 16 through the friction drive constituted by the driving drum 14 and friction members 20 and 23.

By loosening the set screw 34, the bracket 35 may be slid along the arm 28 to any desired position of adjustment and then secured in that position by tightening the set screw.

Also forming part of the retarding and regulating means is another centrifugal weight 38 secured to the movable end of pivoted arm 21 at the point where the friction member 20 is attached thereto.

In accordance with a further feature of the invention, there is provided an additional or auxiliary weight or mass which acts to render operative and effective the system thus far described, to produce the erecting forces for returning the spin axis of the rotor to vertical in the event said axis departs from the vertical for any reason. In the embodiment illustrated, said auxiliary mass comprises a relatively heavy weight 39 adjustably secured to the frame or plate 16 by means of an arm 40 and set screw 41 passing through a slot 42 in a bracket 43 carried by the frame or plate 16. When the frame 16 rotates, the auxiliary mass 39 rotates with it.

The operation of the above-described structure with particular reference to the action of the retarding and regulating means 27, 38 and the action of the auxiliary weight 39, is as follows:

When the gyro rotor is rotated with its shaft 7, the driving drum 14 carried by said shaft drives the frame or carriage 16 through the friction members 20 and 23, thereby rotating said frame or carriage about the shaft 7, together with the centrifugal weights 27 and 28, ball 37 and the relatively heavy auxiliary mass 39. Under the influence of centrifugal force, due to rotation of the carriage or frame 16, the centrifugal weight presses the friction member or brake shoe 30 against the cooperating wall 31 of drum 32, thereby limiting the speed of rotation of the spinning carriage 16 by the friction between the shoe 30 and wall 31.

In the event that the speed of rotation of the spinning carriage 16 should increase, due either to an increase in the speed of the rotor 5 or due to other causes, the centrifugal force of the weight 27 will likewise increase, thereby increasing the braking action of brake shoe 30 against the stationary wall 31 and accordingly retarding the spinning carriage 16 and the rotation of the relatively heavy auxiliary mass 39. At the same time, the centrifugal force acts on weight 38 to reduce the pressure of friction member 20 on the friction collar 23 of the driving drum 14, thereby reducing the driving couple on the spinning carriage 16.

When the speed of rotation of the spinning carriage 16 decreases, the resulting centrifugal force acting on the weights 27 and 28 reduces the friction between brake shoe 30 and wall 31 and simultaneously increases the friction between friction member 20 and driving drum 14, thus reducing the retarding action and increasing the driving action on the spinning carriage 16. In this manner, the carriage 16 and the relatively heavy auxiliary mass 39 tend to take up a speed of rotation such that the two opposite actions described above, i. e., the braking action of shoe 30 against wall 31, and the increased driving action between friction member 20 and driving drum 14, balance each other, thereby bringing about a balance speed of rotation of the carriage 16 and weight 39, which is entirely independent of the speed of the gyroscope and which can be brought down to a few dozen revolutions per minute even though the gyro rotor 5 and, hence, the driving drum 14 rotates at several thousand revolutions per minute.

The ball 37 in the bracket 35 aids in the retarding action of the centrifugal weight 27 on the frame or plate 16 by the rolling friction between said ball and its bracket. The adjustment of the position of the ball 37 along the curved arm 28 by adjusting the bracket 35 permits adjustment of the moment of the centrifugal force in relation to the pivot point 29, which moment adds to that of the weight 27.

Assuming now that, due to a departure of the spin axis of the gyroscope from true vertical, an acceleration force acts in the direction of the central arrow 44, shown in Fig. 1 and in the plane of the paper, and the gyro rotor 5, carriage 16 and auxiliary mass 39 are rotating clockwise as indicated by the arrow 45, the action of this acceleration exerted on the auxiliary mass 39 will tend to increase its speed of rotation at the instant that said mass 39 is in the position shown in Fig. 1, and to decrease its speed at the instant that said mass 39 reaches a position diametrically opposite. The resulting action on the mass 39 is to cause it to linger momentarily in the position diametrically opposite to that shown in Fig. 1, thereby producing by the weight of said mass 39 a moment in the direction toward the plane of the paper and about the axis of pivots 11, thereby causing the spin axis of the rotor to precess about the axis of pivots 10 back to true vertical.

In view of the fact that the speed of rotation of carriage 16 and, hence, of the relatively heavy mass 39, is entirely independent of any variations in speed of the gyroscope and, therefore, substantially constant when the gyro spin axis is in true vertical, the only variations in the speed of rotation of said carriage 16 and mass 39 will be those caused by accelerations acting on said mass 39 when the spin axis departs from the true vertical, and, therefore, even a small acceleration will be sufficient to make the time during which the auxiliary mass 39 travels around one half of the circumference to materially differ from the time required for it to travel around the other half of the circumference. Such a variation manifests itself by a tendency of the gyroscope to erect its axis in the direction of the acceleration and by a direct linear precessional movement and not by a spiral precessional movement.

An acceleration component acting in the direction of the arrow 44 in Fig. 1 also manifests itself by acting on the weight 27 to decrease the pressure of brake shoe 30 on the wall 31, thereby decreasing the retarding action on the carriage 16 and auxiliary mass 39, and by simultaneously acting on weight 38 to increase the driving torque of driving drum 14 on the carriage 16 and auxiliary mass 39. There results, therefore, an increase in the driving torque and a decrease in the retarding or braking action with a consequent increase in the rotational speed of the auxiliary heavy weight 39 during the downward half turn as seen in Fig. 1, and during the upward half turn the acceleration acts on the mass 39 in the reverse direction with a consequent slowing down of said mass.

By adjusting the position of the auxiliary weight 39 by set screw 41 and/or by adjusting the position of the ball 37 along the arm 28, it is possible to regulate, as desired, the phase of the variations of speed of the mass 39 in relation to the angular position thereof.

Referring now to Figs. 3 and 4, there is shown another embodiment of the invention wherein a different form of retarding mechanism is used and wherein a different form of auxiliary mass or weight is used in lieu of or in addition to the auxiliary mass 39 shown in Figs. 1 and 2. By this embodiment greater precision is obtained in that care is taken that the angular speed of the carriage 16 and, therefore, of the auxiliary mass shall not be varied appreciably from time to time by forces other than the acceleration forces acting. For example, forces causing errors might arise from accidental variations of the coefficients of friction of the driving means 14, 20, 23 and retarding means 30, 31 for the carriage or plate 16. To overcome this source of error, the novel retarding means shown in Figs. 3 and 4 are provided.

As illustrated, said novel retarding means, substituted in lieu of weight 27 and friction member 30, comprise a roller 46 journaled by means of a shaft 47 in the pivoted arm 28 and engaging the stationary wall 31 to roll therealong when in engagement therewith while the carriage or frame 16 is rotated, said arm 28 being pivoted at 29 as in Figs. 1 and 2. Secured to or formed integral with the shaft 47 of roller 46 to rotate with the latter is an escapement star wheel 48 which cooperates with a forked anchor 49 pivoted at 50 on the curved arm 28. By this structure there is thus provided an escapement device having a nonisochronous return, the frequency of oscillation, or period, of the forked anchor 49 depending on the value of the motive power.

In the present instance the pivotal axis or shaft 50 of the forked anchor 49 is shown parallel to the spin axis of the gyro rotor 5, i. e. it is vertical in the equilibrium position of the whole assembly. It is also advantageous to locate the center of gravity of the anchor 49 away from its pivotal axis 50 to thus form a block oriented in azimuth in such a manner that the period or frequency of oscillations of said anchor, and consequently the speed of rotation of the carriage 16 shall be affected not only by variations in the driving torque due to the tangential component of the acceleration in the plane of rotation but also by variations in the frequency of the anchor for a given motive force, which frequency is proportional to the relative direction of acceleration.

There is also shown in Figs. 3 and 4 an additional auxiliary mass in the form of a rolling ball 51 arranged to roll freely in a circular track constituted by a trough formed by the stationary drum 32 of the casing 6. This ball 51 will rest against the end of the curved arm 28 when the gyroscope is inclined and said arm will push the ball upward during one-half of a revolution around the trough by the rotation of carriage 16, and will leave the end of said arm 28 during the other half of the revolution around the trough, and will roll downwardly toward the bracket 43 carried by the plate 16.

In this manner, the action of the ball 51 is similar to that of the auxiliary mass 39 in that the ball lingers appreciably longer in one position than in a diametrically opposite position and thus produces a torque on the gyroscope about the axis of pivots 10, 10 or about the axis of pivots 11, 11, depending upon which way the spin axis is inclined from the vertical. This action of the ball 51 is very favorable for a rapid and direct erection of the spin axis of the gyroscope into the true vertical.

There is thus provided a novel gyro-vertical or artificial horizon embodying a vertically spinning gyroscope mounted in gimbals and provided with novel erecting means for maintaining the spin axis of the gyroscope in true vertical at all times without the use of reaction air-jets and/or pendulums, and by reason of which the erecting system is not disturbed when the gyro-vertical is used on an aircraft during violent maneuvers but continues to perform its function properly and efficiently at all times.

Although only two embodiments of the invention have been illustrated and described, various changes and modifications in the form and relative arrangement of parts, which will now appear to those skilled in the art, may be made without departing from the scope of the invention. Reference is therefore to be had to the appended claims for a definition of the limits of the invention.

What is claimed is:

1. In a gyro-vertical, the combination of a gyroscope comprising gimbals and a gyro rotor mounted in said gimbals for spinning about a normally vertical axis and for angular movement about two mutually perpendicular horizontal axes at right angles to said spin axis, a mass, means mounting said mass on said gyroscope for rotation about the spin axis of said gyro rotor, and variable driving means actuated from said gyro rotor for rotating said mass about the spin axis of said rotor, said driving means causing said mass to rotate at variable speed when the gyroscope inclines from the vertical position so that erecting forces are produced which return the gyroscope to the vertical position.

2. In a gyro vertical, the combination of a gyroscope comprising gimbals and a gyro rotor mounted in said gimbals for rotation about a normally vertical axis and for angular movement about two mutually perpendicular horizontal axes at right angles to said spin axis, a mass, means mounting said mass on said gyroscope for rotation about the spin axis of said gyro rotor, a driving device carried by said mounting means for rotating said mass about said spin axis, said drive being taken from said gyro rotor, and a braking or retarding device carried by the mounting means of said mass for retarding the rotation of said mass, the action of said driving and braking devices varying when the gyroscope departs from the vertical, to produce a varying drive of said mass so that erecting forces are set up which return the gyroscope to the vertical.

3. In a gyro vertical, the combination of a gyroscope comprising a rotor mounted for spinning about a vertical axis, means mounting said rotor for angular movement about two mutually perpendicular horizontal axes at right angles to the spin axis, a rotatable frame, means mounting said frame on said gyroscope for rotation about the spin axis of said rotor, means cooperating with said rotor for driving said frame at a speed substantially less than the speed of said rotor, a weight associated with said frame for rotation thereby about the spin axis of said rotor, and means carried by the frame and controlled by said weight for retarding said frame to vary the speed thereof upon departure of the spin axis of said rotor from the vertical, whereby erecting forces are produced to return the spin axis back to vertical.

4. In a gyro vertical, the combination of a gyroscope comprising a rotor mounted for spinning about a vertical axis, means mounting said rotor for angular movement about two mutually perpendicular horizontal axes at right angles to said spin axis, a rotatable frame, means mounting said frame on said gyroscope for rotation about the spin axis of said rotor, means on said frame and on said rotor forming a slip drive for rotating said frame at a speed substantially less than the speed of said rotor, a weight associated with said frame for rotation thereby about the spin axis of said rotor, and means carried by said frame and controlled by said weight for retarding said frame to vary the speed thereof and of said weight when the spin axis of said rotor departs from the vertical, whereby erecting forces are produced on said gyroscope to return the spin axis back to vertical.

5. In a gyro vertical, the combination of a gyroscope comprising a casing, means mounting said casing for angular movement about two mutually perpendicular horizontal axes, a gyro rotor mounted in said casing for spinning about a vertical axis, means forming a stationary circular track co-axial with the spin axis of said rotor, said track having an annular side wall, a rotatable frame, means mounting said frame above said track for rotation about the spin axis of said rotor, means comprising a rolling ball in said track and cooperating with said frame for rotation thereby in said track, means on said frame and on said rotor forming a slip drive for rotating said frame about the spin axis of said rotor at a speed substantially less than the speed of said rotor, whereby said ball is rolled around said track and at substantially the same speed as said frame, and means on said frame and cooperating with the side wall of said track for retarding said frame to vary the speed thereof and of said ball when the spin axis of said rotor departs from vertical, whereby erecting forces are produced on the gyroscope to return said spin axis back to vertical.

6. In a gyro vertical, the combination of a gyroscope comprising a casing, means mounting said casing for angular movement about two mutually perpendicular horizontal axes, a gyro rotor journaled in said casing for spinning about a vertical axis, means attached to said casing and forming a stationary circular track co-axial with the spin axis of said rotor, said track having an annular side wall, a rotatable frame, means mounting said frame above said track for rotation about the spin axis of said rotor, means comprising a rolling ball adapted to roll in said track and cooperating with said frame for rotation thereby in said track, means on said frame and on said rotor forming a slip drive for rotating said frame about the spin axis of said rotor at a speed substantially less than the speed of said rotor, whereby said ball is rolled around said track and at substantially the same speed as said frame, and an escapement device carried by said frame and cooperating with the side wall of said track for retarding said frame to vary the speed thereof and of said ball when the spin axis of said rotor departs from the vertical, whereby erecting forces are produced on the gyroscope to return said spin axis back to vertical.

7. In a gyro vertical, the combination of a gyroscope comprising gimbals and a gyro rotor mounted in said gimbals for spinning about a vertical axis and for angular movement about two mutually perpendicular horizontal axes at right angles to said spin axis, a rotatable plate, an auxiliary mass carried by said plate, means mounting said plate and mass for rotation about the spin axis of said rotor, a driving device for rotating said plate and said mass about said spin axis and comprising cooperating friction members on said plate and on said rotor, a braking device carried by said plate, and a regulating mechanism included in said braking device for causing a resisting couple to the rotation of said plate, which couple is proportional to the speed of said rotating mass, said driving and braking devices driving said auxiliary mass at a variable speed when the spin axis of said rotor departs from vertical, whereby erecting forces are produced to return said spin axis back to vertical.

8. In a gyro vertical, the combination of a gyroscope comprising gimbals and a gyro rotor mounted in said gimbals for spinning about a vertical axis and for angular movement about two mutually perpendicular horizontal axes at right angles to said spin axis, a rotatable plate, an auxiliary mass carried by said plate, means mounting said plate and mass for rotation about the spin axis of said rotor, a driving device for rotating said plate and said mass about said spin axis and comprising cooperating friction members on said plate and on said rotor, a braking device carried by said plate, and a regulating mechanism included in said braking device for causing a resisting couple to the rotation of said plate, which couple is proportional to the speed of said rotating mass, said driving and braking devices driving said auxiliary mass at a variable speed when the spin axis of said rotor departs from vertical, whereby erecting forces are produced to return said spin axis back to vertical, said regulating device comprising an escapement wheel and a nonisochronous anchor cooperating with said escapement wheel.

9. In a gyro vertical, the combination of a gyroscope having a rotor including a shaft mounted for spinning about a normally vertical axis, means mounting said rotor for relative angular movement about two mutually perpendicular horizontal axes at right angles to said spin axis, a rotatable frame, means mounting said frame co-axially with said rotor for rotation about the spin axis of said rotor, means cooperating with the shaft of said rotor for driving said frame about said spin axis, means providing a confined circular path co-axial with said rotor and frame, and means including a rolling mass rolling in said circular path and cooperating with said frame and effective upon departure of the spin axis of said rotor from the vertical for varying the speed of rotation of the frame, whereby erecting forces are produced to return the spin axis of said rotor back to vertical.

10. In a gyro vertical, the combination of a gyroscope having a rotor including a shaft mounted for spinning about a vertical axis, means mounting said rotor for relative angular movement about two mutually perpendicular horizontal axes at right angles to said spin axis, a rotatable frame, means mounting said rotatable frame co-axially with said rotor for rotation about the spin axis of said rotor, friction means cooperating with the shaft of said rotor for driving said frame about the spin axis of said rotor at a speed substantially less than the speed of said rotor, means providing a confined circular path co-axial with said rotor and frame, means comprising a rolling mass rolling in said path and cooperating with said frame for rotation thereby around said path, and means controlled by the weight of said mass to produce a braking action on said rotating frame to vary the speed thereof and effective upon departure of the spin axis of said rotor from the vertical, whereby erecting forces are produced on the gyroscope to return the spin axis of said rotor back to vertical.

11. In a gyro vertical, the combination of a gyroscope having a rotor including a shaft mounted for spinning about a vertical axis, means mounting said rotor for relative angular movement about two mutually perpendicular horizontal axes at right angles to said spin axis, a rotatable frame, means mounting said rotatable frame co-axially with said rotor, friction means cooperating with the shaft of said rotor for driving said frame about the spin axis of said rotor at a speed substantially less than the speed of said rotor, means for maintaining the speed of said frame substantially constant while the spin axis of said rotor is vertical, means providing a confined circular path co-axial with said rotor and frame, means comprising a single rolling mass rolling in said path and cooperating with said frame for rotation thereby around said path, and means controlled by the weight of said mass to produce a braking action on said rotating frame to vary the speed thereof and of said rolling mass and effective upon departure of the spin axis of said rotor from the vertical, whereby erecting forces are produced on the gyroscope to return the spin axis of said rotor back to vertical.

12. In a gyro vertical, the combination of a gyroscope comprising a gimbal frame pivoted about two mutually perpendicular horizontal axes, a gyro rotor including a shaft mounted in said gimbal frame for spinning about a vertical axis, a rotatable frame, means mounting said rotatable frame co-axially with said rotor for rotation about the spin axis of said rotor, means cooperating with the shaft of said rotor for driving said rotatable frame about the spin axis of said rotor at a speed substantially less than the speed of said rotor, means providing a confined circular path co-axial with said frame and rotor, means comprising a single rolling mass adapted to roll in said path and cooperating with said frame for rotation thereby around said path, and braking means carried by said frame for producing a braking action on said frame to vary its speed of rotation, said braking means comprising an escapement device controlled by the weight of said rolling mass and effective upon a departure of the spin axis of said rotor from the vertical to control the speed of rotation of said rotatable frame, whereby erecting forces are produced on the gyroscope to return the spin axis of said rotor back to vertical.

13. In a gyro vertical, the combination of a gyroscope comprising a rotor mounted for spinning about a vertical axis, means mounting said rotor for relative angular movement about two mutually perpendicular horizontal axes at right angles to said spin axis, a rotatable frame, means mounting said rotatable frame for rotation about the spin axis of said rotor, means providing a slip drive between said frame and rotor for rotating said frame about the spin axis of said rotor at a speed substantially less than the speed of said rotor, means carried by said frame for maintaining the speed of said frame substantially constant while the spin axis of said rotor is vertical but adapted to vary said speed when the axis of said rotor departs from the vertical, and means comprising a weight rotated by said frame about the spin axis of said rotor and effective upon departure of said spin axis from the vertical to cause the means carried by said frame to vary the speed of said frame, whereby erecting forces are produced on the gyroscope to return the spin axis of said gyroscope back to vertical.

14. In a gyro vertical, the combination of a gyroscope comprising a rotor mounted for spinning about a vertical axis, means mounting said rotor for relative angular movement about two mutually perpendicular horizontal axes at right angles to said spin axis, a rotatable frame, means mounting said rotatable frame co-axially with said rotor for rotation about the spin axis of said rotor, means providing a slip drive between said frame and rotor for rotating said frame about the spin axis of said rotor at a speed substantially less than the speed of said rotor, means providing a stationary circular track having an annular side wall co-axial with the spin axis of said rotor, means comprising an escapement device carried by said frame and cooperating with said side wall to maintain the speed of rotation of said frame substantially constant while the spin axis of said rotor is vertical but adapted to vary said speed when said spin axis departs from the vertical, and means comprising a weight associated with said frame for rotation thereby about the spin axis of said rotor and effective upon departure of said spin axis from the vertical to cause said escapement device to vary the speed of said frame, whereby erecting forces are produced on the gyroscope to return the spin axis of said rotor back to vertical.

15. In a gyro vertical, the combination of a gyroscope comprising a rotor mounted for spinning about a vertical axis, means mounting said rotor for relative angular movement about two mutually perpendicular horizontal axes at right angles to said spin axis, a rotatable frame, means mounting said rotatable frame co-axially with said rotor for rotation about the spin axis of said rotor, means providing a slip drive between said frame and rotor for rotating said frame about the spin axis of said rotor at a speed substantially less than the speed of said rotor, means providing a stationary circular track having an annular side wall co-axial with the spin axis of said rotor, means comprising an escapement device carried by said frame and cooperating with said side wall to maintain the speed of rotation of said frame substantially constant while the spin axis of said rotor is vertical but adapted to vary said speed when said spin axis departs from the vertical, and means comprising a weight associated with said frame for rotation thereby about the spin axis of said rotor and effective upon departure of said spin axis from the vertical to cause said escapement device to vary the speed of said frame, whereby erecting forces are produced on the gyroscope to return the spin axis of said rotor back to vertical, said weight comprising a rolling ball rolling in said circular track.

ROBERT ALKAN.